(12) United States Patent
Winkler (10) Patent No.: US 9,162,817 B2
(45) Date of Patent: Oct. 20, 2015

(54) CONVEYOR SYSTEM, STORAGE AND RETRIEVAL DEVICE AND LOGISTICS SYSTEM

(76) Inventor: Walter Winkler, Parkstein (DE)

( * ) Notice: Subject to any disclaimer, the term of this patent is extended or adjusted under 35 U.S.C. 154(b) by 0 days.

(21) Appl. No.: 12/555,321

(22) Filed: Sep. 8, 2009

(65) Prior Publication Data

US 2010/0061833 A1 Mar. 11, 2010

(30) Foreign Application Priority Data

Sep. 9, 2008 (DE) .......................... 10 2008 041 927

(51) Int. Cl.
*B65G 1/04* (2006.01)
*B65G 1/137* (2006.01)

(52) U.S. Cl.
CPC ............ *B65G 1/1378* (2013.01); *B65G 1/0435* (2013.01)

(58) Field of Classification Search
CPC .................................................... B65G 1/0407
USPC ............... 414/278, 277, 280; 198/418.6, 426, 198/429, 432, 433
See application file for complete search history.

(56) References Cited

U.S. PATENT DOCUMENTS

| | | | | |
|---|---|---|---|---|
| 3,669,283 A * | 6/1972 | Brown, Jr. | ...................... | 414/796 |
| 3,893,575 A * | 7/1975 | Pearne et al. | ................... | 414/796 |
| 4,103,787 A * | 8/1978 | Salloum | .......................... | 414/276 |
| 4,729,467 A * | 3/1988 | Vanderlinde | ................... | 198/586 |
| 4,909,697 A * | 3/1990 | Bernard et al. | .......... | 414/331.04 |
| 5,135,344 A * | 8/1992 | Kita et al. | ...................... | 414/273 |
| 5,441,141 A * | 8/1995 | Bonnet | .................... | 198/370.03 |
| 5,599,154 A * | 2/1997 | Holscher et al. | .............. | 414/278 |
| 6,164,045 A * | 12/2000 | Focke et al. | ..................... | 53/543 |
| 6,315,513 B1* | 11/2001 | Harukawa et al. | ............. | 414/286 |
| 6,328,153 B1* | 12/2001 | Manghi et al. | ................. | 198/736 |
| 6,681,916 B2* | 1/2004 | Hiroki | ......................... | 198/347.1 |
| 7,329,081 B2* | 2/2008 | Baker et al. | .................... | 414/626 |
| 2003/0185656 A1* | 10/2003 | Hansl | ............................. | 414/277 |
| 2007/0140817 A1* | 6/2007 | Hansl | ............................. | 414/277 |

FOREIGN PATENT DOCUMENTS

| | | |
|---|---|---|
| DE | 2924827 | 1/1981 |
| DE | 19860865 | 10/1999 |
| EP | 0557824 | 9/1993 |
| EP | 1180487 | 2/2002 |
| WO | 2008089980 | 7/2008 |

* cited by examiner

*Primary Examiner* — Jonathan Snelting
(74) *Attorney, Agent, or Firm* — Price, Heneveld LLP (57) ABSTRACT

A conveyor system for conveying unit loads, comprising at least one conveyor element, said conveyor element comprising a conveyor for transporting at least two unit loads in a conveying direction, the at least two unit loads being arranged side-by-side in a direction transverse to the conveying direction and to a storage and retrieval device comprising at least one carrier and a load bearing module, wherein the load bearing module has at least two carriages. A logistics system for storage, retrieval and collation of unit loads, comprising at least a store for storing unit loads, and at least one conveyor system. Moreover, a method of operating a logistics system with at least one storage and retrieval device and/or a conveyor system is disclosed, wherein at the storage and retrieval device and/or the conveyor system at least two unit loads are operated at the same time.

11 Claims, 5 Drawing Sheets

CONVEYOR SYSTEM, STORAGE AND RETRIEVAL DEVICE AND LOGISTICS SYSTEM

FIELD OF THE INVENTION

The present invention relates to a conveyor system for conveying unit loads (merchandise items). In addition, the invention relates to a storage and retrieval device (shelf operating device).

BACKGROUND OF THE INVENTION

Logistics systems and conveyor systems or storage and retrieval devices used in logistics systems are known in different designs. Goods are continuously stored and retrieved in the logistics systems. The goods are delivered in large units, e.g., on pallets, and then stored in shelf compartments (storage racks). In addition, usually simultaneously, various goods are retrieved from the store and collated to customer specification.

The aim of all logistic systems is to achieve the highest-possible throughput in terms of storage and retrieval processes for the least-possible technical outlay. This can be accomplished in principle by increasing the speed of individual conveyor elements or by providing several identical components for parallel operation. Increasing the speed, e.g., of the conveyor systems, however, greatly increases the demands on the performance and ruggedness of the mechanics. Increasing the capacity through the use of components for parallel operation, in contrast, creates the problem of increased space requirement and increased mixing of different, separated unit loads within the logistics system. The latter, in turn, increases the outlay for storing the unit loads in a shelf storage (high-bay racking) by means of a shelf operating device (storage and retrieval device).

SUMMARY OF THE PRESENT INVENTION

Proceeding therefrom, an object of the present invention is to develop a logistics system, a transport system and a storage and retrieval device, such that the throughput of the logistics system, the conveyor system or storage and retrieval device is increased, without high mechanical outlay.

An aspect of the present invention includes providing a conveyor system for conveying unit loads comprising at least one conveyor element, the conveyor element comprising a conveyor for transporting at least two unit loads arranged side-by-side in one conveying direction. In particular, two or more unit loads can be arranged in parallel side-by-side transverse (e.g., perpendicular) to the conveying direction and transported side-by-side together by a single conveyor. Accordingly, several columns of unit loads may be transported side-by-side.

The conveyor system can facilitate a higher transport volume due to the parallel conveying of unit loads/trays with few dynamic movements. Availability of the system can thereby be increased. An outcome is the possibility of reducing the transport speed and thus the mechanical load on the components of the conveyor element. This can benefit the service life of the system.

The conveyor element can have a conveyor surface on which at least two unit loads can be arranged side-by-side in the direction transverse (e.g., perpendicular) to the conveying direction. It is also possible for unit loads on, e.g., trays of different sizes, to be arranged side-by-side on one conveyor element (for example two to four trays).

The conveyor element can have a conveyor surface on which at least two rows of unit loads can be arranged one behind the other with the unit loads arranged side-by-side. For example, six to twelve unit loads can be arranged on the conveyor surface. The unit loads are accommodated, for example, on trays which can have different, though standardized sizes. Each unit load may be contained in a separate tray while also several unit loads may be contained in one single tray.

The conveyor can be at least one roller conveyor. In an alternative embodiment, the conveyor can have at least one device, such as a bar, for pushing a row of unit loads arranged side-by-side.

Another aspect of the present invention is to provide a storage and retrieval device comprising at least one carrier and a load bearing module, with the load bearing module having at least two carriages. The length of the carriages can match a width of a conveyor surface of the previously described conveyor elements.

If the length of the carriage matches the width of a row of unit loads arranged side-by-side side-by-side in the conveyor element, each carriage can accommodate exactly one of these rows.

The carriages can be arranged at a vertical distance from each other.

The carriages can be spaced apart from each other by a distance matching the distance between a storage module and a retrieval module, such that the first carriage can accommodate a row of unit loads, while the second carriage is simultaneously releasing unit loads.

The carriages can be rigidly spaced apart from each other.

At least one of the carriages can be configured such that the carriage can accommodate only unit loads from one storage module and release them into a rack slot (shelf compartment).

The at least one carriage can be configured without a lifting device. A lifting device, however, may be needed for retrieving unit loads from a rack slot. Precisely this retrieval, however, is not provided for with regard to one of the two (or more) carriage modules. The other carriage, or at least one of the other carriages, can be configured such that it is suitable for storage into and retrieval from the rack (shelf).

The storage and retrieval device can have at least one device for accommodating the unit loads from a receiving module and for releasing the accommodated unit loads to a rack slot.

The device can have a device for horizontal transportation of the unit loads along the storage surface of the carriage. For example, a conveyor belt may be provided for transporting the unit loads.

The carriage can have a device for pushing the released unit loads in the release direction of the unit loads.

The device can include a bar (e.g., a belt-driven bar). The bar can be rotatably mounted to the carriage.

It is contemplated that the system can include devices for pushing the released unit loads in the release direction of the unit loads on both sides of the carriage.

A system for storage, retrieval and collation of unit loads can comprise at least one store for storing unit loads, and at least one conveyor system as described above. The logistics system is usually provided for the purpose of collating different goods.

The logistics system can have a shelf storage (e.g., high-bay racking). The logistics system can have a storage and retrieval device (e.g., a storage and retrieval device as described above).

The logistics system can have at least one separation device for separating unit loads from a totality of unit loads and/or a picker (commissioner) for collating unit loads from the store. The separation device may be, for example, a depalletizer.

DETAILED DESCRIPTION OF PREFERRED EMBODIMENTS

Figure 1:
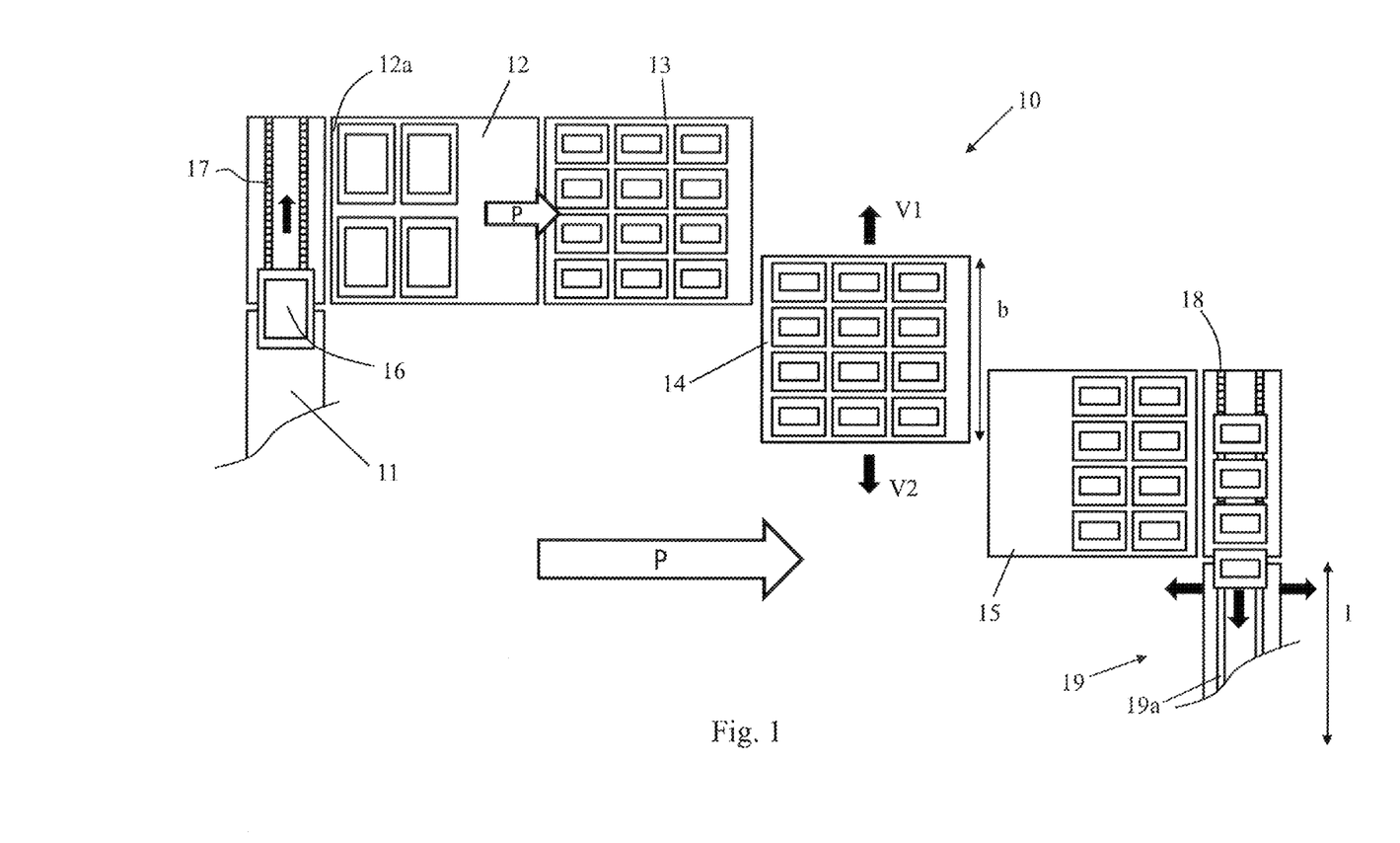
FIG. 1 illustrates a schematic of a section of an inventive conveyor system.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows a first section 10 of a conveyor system.

The conveyor system 10 comprises a source 11, for example, a pallet store with a depalletizer. The source 11 separates a large quantity of unit loads or transport units, such as trays having standard dimensions (e.g., 700×500 mm and 350×500 mm). In addition, the conveyor system 10 has several inventive conveyor elements (tray collection conveyors—TCCs) 12, 13, 14 and 15, described in more detail later.

The depalletized, usually packaged, unit loads 16 are positioned beside each other by the source 11 by means of a conveyor belt 17 before entering the first conveyor element 12 along an entry side 12a of the first conveyor element 12. The unit loads 16 positioned side-by-side (for example, on trays) pass, positioned in parallel, through the conveyor elements 12, 13, 14 and 15. The arrow P indicates the main transport direction of the unit loads 16. Then they are brought by means of another conveyor belt 18 to the carriage 19a of a storage and retrieval device 19.

As is clear from FIG. 1, the unit loads 16 can have different (but usually standardized) sizes. However, in the context of the illustrated embodiment, at least two unit loads 16 are arranged side-by-side transverse to the transport direction P on the conveyor elements 12, 13, 14 and 15.

By virtue of the parallel transport in the direction P, on one hand the unit loads 16 from the source 11 remain bundled by type until received by the storage and retrieval device 19, that is, the unit loads 16 released sequentially from the source 11 are brought to the storage and retrieval device 19 without being mixed by the conveyor system 10.

A further aspect of the conveyor system 10 is that a width b of the conveyor elements 12, 13, 14 and 15 can match a length l of the carriage 19a of the storage and retrieval device 19. In this way, the carriage 19a can always be loaded with unit loads 16 of the same type, which remain side-by-side on passage through the conveyor elements 12, 13, 14 and 15. This can ensure that the shelves of the storage and retrieval device 19 are always loaded with a specific type of unit load. Furthermore, a quantification of the groups and parallel transportation of unit load 16 in the transport direction P though the conveyor elements 12, 13, 14 and 15 enables a large quantity of unit loads 16 to be transported by simple mechanics that are relatively easy to master technically.

The conveyor elements 12, 13, 14 and 15 can be arranged such that the rows of unit loads 16 arranged side-by-side pass through them sequentially. A quantity of unit loads 16 is grouped together on the first conveyor element 12. In this embodiment, from 6 to 12 trays can be grouped together.

The third conveyor element 14 can divide up the trays for different target areas (e.g., automatic small parts store), with the conveyor element being capable of being pushed in the directions V1 and V2 at right angles to the main transport direction P. The divided quantities are further separated in the conveyor area by a conveyor belt 18 and forwarded to the corresponding target area, for example, a small parts store.

Figure 2:
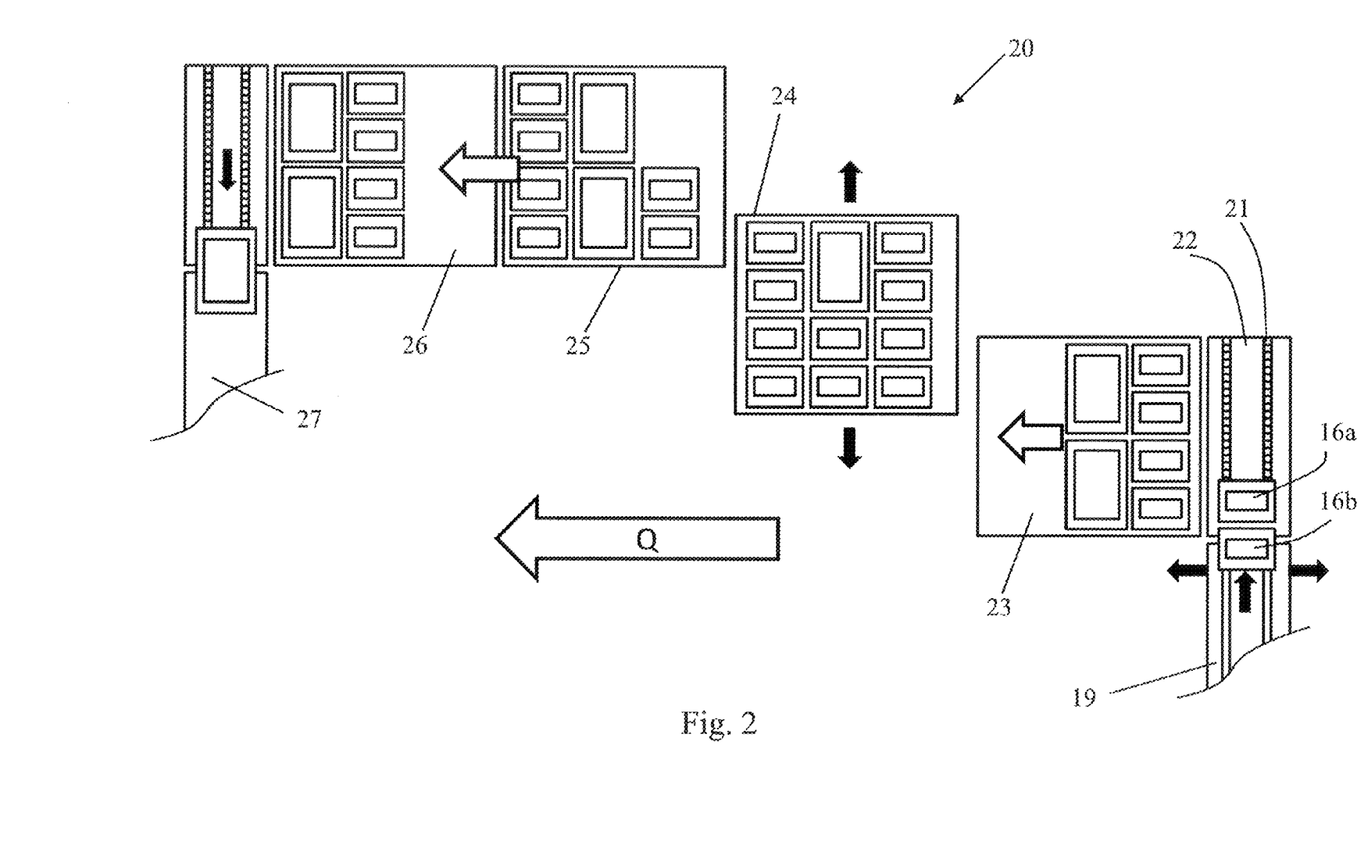
FIG. 2 illustrates a schematic of a further section of an inventive conveyor system.

FIG. 2 shows a second sub-area 20 of the conveyor system. This area is where unit loads 16, for example, are picked or collated, for example, in line with a customer order.

In this regard, the desired unit loads/transport units 16a, 16b... are collated as needed, e.g., from an automatic small parts store, to form individual rows and are arranged on a first conveyor element 23. Proceeding from a conveyor 22, which is the source 21 in the present case, the unit loads 16a, 16b... arranged in rows are transported through the sub-area 20 in a main transport direction Q. They pass through several inventive conveyor elements (TCCs) 23, 24, 25 and 26 on the way.

Transporting of the unit loads follows the sequence already discussed in connection with the embodiment of FIG. 1, but in the opposite direction. The second conveyor element 24 serves as a pusher for a collated group of goods for forwarding to a target area 27.

Figure 3:
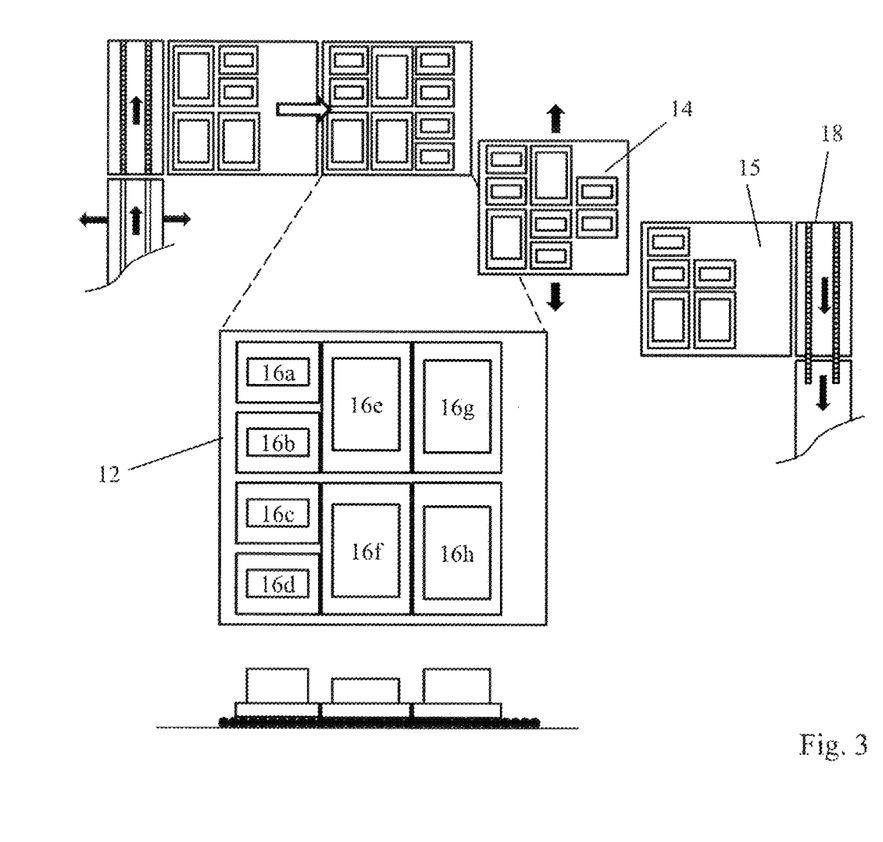
FIG. 3 is an illustration of an inventive conveyor element.

FIG. 3 shows an enlarged view of another conveyor element (in this example, the conveyor element 12). On the conveyor element 12 are arranged unit loads 16a, 16b, 16c, 16d, 16e, 16f, 16g and 16h. These have different, but standardized, sizes.

The conveyor elements 12, 13, 14, 15, 23, 24, 25 and 26 can comprise all sorts of conveyor elements, e.g., be configured as roller conveyors, but also can have bars for pushing the individual, side-by-side groups of unit loads 16 in a transport direction P or Q. In the last mentioned transport principle, the distances between the side-by-side rows of goods can be varied.

Figure 4:
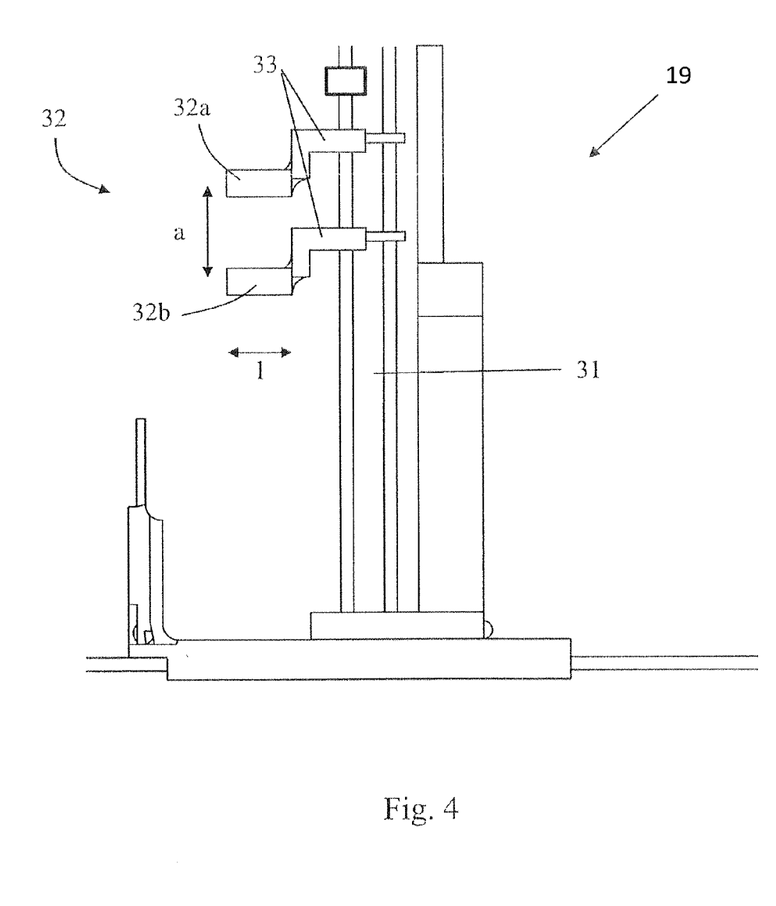
FIG. 4 shows an inventive storage and retrieval device.

FIG. 4 shows a storage and retrieval device 19. The storage and retrieval device 19 has a carrier 31, which, on rails for example, can be moved at least in the storage area.

Arranged at the carrier 31 is a vertically adjustable load bearing module 32. The load bearing module has a first carriage 32a and a second carriage 32b. These are attached by movable guides 33 to the carrier 31. The carriages 32a and 32b are rigidly connected to each other. The distance between the carriages can match the distance between a storage module and a retrieval module, so that one carriage 32a or 32b can be loaded while the other is being unloaded.

One of the two carriages 32a or 32b can be configured such that it can only receive goods from the storage module and place them in a rack slot. In this way, element performance can be maximized. Using one of the carriages 32a or 32b solely for the storing process relieves the burden on the system, since typically 90% of storage cycles involve the same type of cycle. This means that a full load of one carriage is placed in one rack slot. For retrieval, however, increasingly different articles must be sorted together. The carriage 32a or 32b, which is suitable only for storing, thus cannot increase the retrieval performance.

An advantage of this design of one of the carriages 32a and 32b, however, is the possibility of making the conveyor device substantially simpler. As is clear from FIG. 5, the carriage 32a, which is used only for storing, has just one conveyor belt 34. This conveyor belt 34 is all that is needed for accommodating goods from a storage module on the carriage 32a. The corresponding unit loads in this case are usually of the same type.

Figure 5:
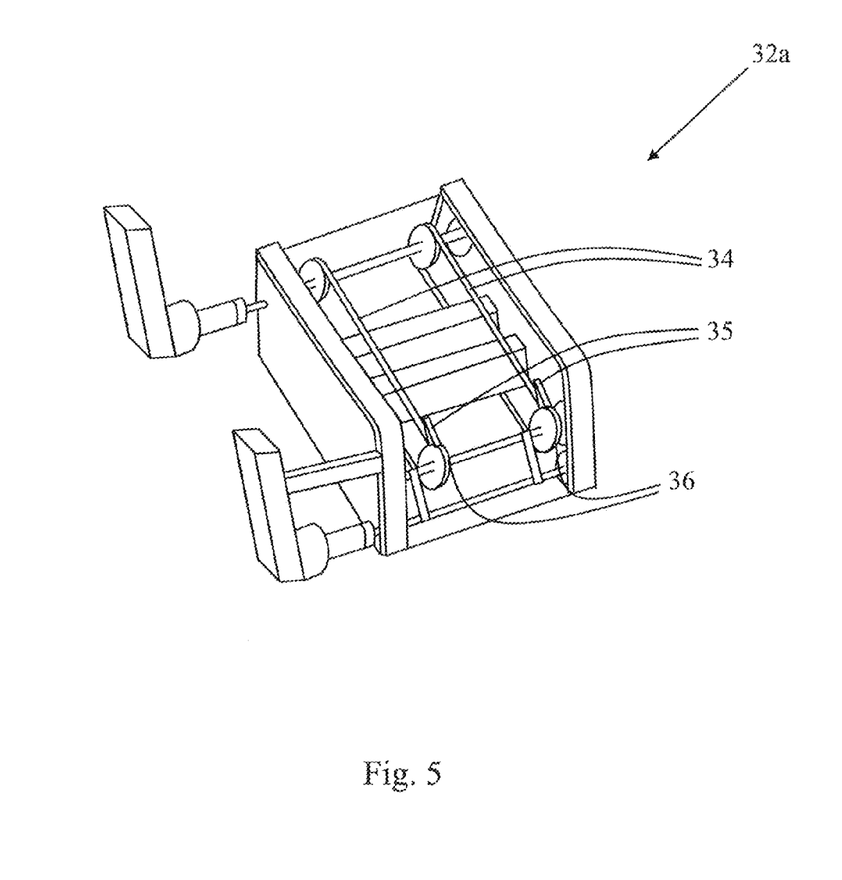
FIG. 5 shows an inventive carriage.

For storage in a rack slot, the conveyor 34 is actuated for placing the unit loads arranged in rows in the rack. To prevent the last stored packaging unit from protruding out of the rack slot, the carriage 32a can have a pusher 35 which can be actuated via belt 36. This pusher 35 ensures that, at the conclusion of the storage process in a rack, the last unit load is pushed fully or flush into the slot.

In this way, simple mechanical means can be used to effect the storage process without lifting the trays arranged on the carriage 32a. In this way, namely through elimination of lifting, a lifting mechanism can be completely dispensed with. The result is that fewer motors are used.

Accordingly, aspects of the present invention can include the following features.

A conveyor system for conveying unit loads, comprising at least one conveyor element, with the conveyor element comprising a conveyor for transporting at least two unit loads in a conveying direction, the at least two unit loads being arranged side-by-side in a direction transverse to the conveying direction.

A conveyor system in accordance with the preceding paragraph, wherein the conveyor element has a conveyor surface, on which at least two unit loads can be arranged side-by-side in a direction transverse to the conveying direction.

A conveyor system in accordance with either of the previous two paragraphs, with the conveyor element having a conveyor surface, on which at least two rows of unit loads can be arranged one behind the other.

A conveyor system in accordance with any of the previous three paragraphs, wherein the conveyor has at least one of the group comprising a roller conveyor, elements for pushing unit loads, pushing bars and swiveling elements.

A storage and retrieval device comprising at least one carrier and a load bearing module, wherein the load bearing module has at least two carriages.

A storage and retrieval device in accordance with the preceding paragraph, wherein the carriages are rigidly connected to each other at a distance.

A storage and retrieval device in accordance with either of the previous two paragraphs, wherein the carriages are arranged at a vertical distance from each other.

A storage and retrieval device in accordance with either of the previous two paragraphs, wherein the load bearing module is movably arranged at the carrier.

A storage and retrieval device in accordance with any of the previous three paragraphs, wherein at least one of the carriages is configured without a lifting device.

A storage and retrieval device in accordance with any of the previous four paragraphs, further including a device for horizontal transportation of the unit loads along the storage surface of the carriage.

A storage and retrieval device in accordance with any of the previous five paragraphs, wherein the carriage has a device for pushing the released unit loads in the release direction of the unit loads.

A storage and retrieval device in accordance with any of the previous six paragraphs, wherein the device comprises a bar, especially a bar actuated via a belt.

A storage and retrieval device in accordance with the previous paragraph, wherein the bar is mounted rotatably to the carriage.

A storage and retrieval device in accordance with any of the previous eight paragraphs, further including devices for pushing the released unit loads in the release direction of the unit loads on both sides of the carriage.

A logistics system for storage, retrieval and collation of unit loads, comprising at least a store for storing unit loads, and at least one conveyor system in accordance with any of features of any of the conveyor system outlined above.

A logistics system in accordance with the preceding paragraph, including at least one of a shelf storage or high-bay racking.

The logistics system in accordance with either of the two preceding paragraphs, wherein the logistics system has at least one storage and retrieval device, especially a storage and retrieval device as outlined above.

A logistics system in accordance with the preceding paragraph, wherein the carriages of the storage and retrieval device have a length which essentially matches the width of a row of unit loads arranged side-by-side in a conveying element of the conveyor system.

A logistics system in accordance with either of the two preceding paragraphs, wherein the carriages of the storage and retrieval deice are arranged at a distance from each other which matches the distance between a storage module and a retrieval module of the logistics system.

A logistics system in accordance with any of the three preceding paragraphs, wherein at least one of carriages of the storage and retrieval device is configured such that the carriage can receive only unit loads from a storage module and release them to a rack slot.

A logistics system in accordance with any of the four preceding paragraphs, wherein at least one of the carriages has a device for receiving the unit loads from a receiving module and for releasing the received unit loads to a rack slot.

A logistics system in accordance with any of the five preceding paragraphs, wherein the logistics system has at least one separation device for separating unit loads from a totality of unit loads and/or a picker for collating unit loads from the stores.

A method of operating a logistics system with at least one storage and retrieval device and/or a conveyor system, wherein at the storage and retrieval device and/or at the conveyor system at least two unit loads are operated at the same time.

A method in accordance with the preceding paragraph, wherein the at least two unit loads are handled together or independently and/or in the same or opposite directions.

I claim:

1. A conveyor system for conveying unit loads, comprising:
   a first conveyor having a first conveying direction for conveying unit loads one behind the other along the first conveying direction,
   a second conveyor having a second conveying direction for conveying unit loads one behind the other along the second conveying direction, and
   a third conveyor between the first conveyor and the second conveyor for conveying at least two unit loads in a third conveying direction, which is transverse to the first and second conveying directions, the third conveyor comprising:
      an entry side along the first conveying direction of the first conveyor,
      an exit side along the second conveying direction of the second conveyor, and a conveyor surface on top of which the at least two unit loads are arranged side-by-side in a row in a direction transverse to the third conveying direction and parallel to the first and second conveying direction for parallel transport of the at least two unit loads in the third conveying direction on the conveyor surface from the entry side to the exit side; and wherein the third conveyor is configured such that the at least two unit loads are positioned substantially adjacent in parallel along the entry side by the first conveyor and transported in a parallel, side-by-side, transverse arrangement of the row with regard to the third conveying direction on the at least one third conveyor to the exit side to be released row-by-row to the second conveyor, and wherein the third conveyor comprises at least one conveyor element which is designed such that the conveyor element is able to move transverse to the third conveying direction with the unit loads accommodated on top of the conveyor surface of the conveyor element during transport of the unit loads from the entry side to the exit side.

2. The conveyor system in accordance with claim 1, wherein at least two rows of unit loads can be arranged one behind the other on the conveyor surface of the third conveyor.

3. The conveyor system in accordance with claim 1, wherein the at least one conveyor element includes at least one element for pushing unit loads.

4. A logistics system for storage, retrieval and collation of unit loads, comprising:
   at least a store for storing unit loads, the store comprising a rack with a rack slot, the unit loads being stored in a row in the rack slot; and
   a conveyor system having:
      a first conveyor having a first conveying direction and second conveyor having a second conveying direction for conveying unit loads comprising:
         at least a third conveyor located between the first conveyor and the second conveyor for conveying the at least two unit loads in a third conveying direction, which is transverse to the first and second conveying directions,
      the third conveyor comprising:
      an entry side along the first conveying direction of the first conveyor, the entry side being adjacent the first conveyor from which the at least two unit loads are received,
      an exit side along the second conveying direction of the second conveyor, the exit side being adjacent the second conveyor from which the at least two unit loads are moved to the second conveyor, and
         a conveyor surface on top of which the at least two unit loads are arranged side-by-side in a row in a direction transverse to the third conveying direction for parallel transport of the at least two unit loads in the third conveying direction on the conveyor surface from the entry side to the exit side,
      wherein the third conveyor is configured such that the at least two unit loads are positioned substantially adjacent in parallel along the entry side by the first conveyor and transported in a parallel, side-by-side, transverse arrangement of the row with regard to the third conveying direction on the third conveyor to the exit side to be released row-by-row to the second conveyor, and
      wherein the third conveyor comprises at least one conveyor element which is designed such that the conveyor element is able to move transverse to the third conveying direction with the unit loads accommodated on top of the conveyor surface of the conveyor element during transport of the unit loads from the entry side to the exit side.

5. The logistics system in accordance with claim 4, further including at least one storage and retrieval device comprising at least one carrier and a load bearing module, wherein the load bearing module has at least two carriages and is provided for transport of the unit loads into the rack or retrieval of the same from the rack.

6. The logistics system in accordance with claim 5, wherein the at least two carriages of the storage and retrieval device have a length which substantially matches a width of the row of unit loads arranged side-by-side in the at least one conveying element of a conveyor.

7. A logistics system for storage, retrieval and collation of unit loads, comprising:
   at least a store for storing the unit loads, the store comprising a rack with a rack slot, the unit loads being stored in a row in the rack slot;
   a conveyor system having:
      a first conveyor having a first conveying direction for conveying the unit loads one behind the other along the first conveying direction,
      a second conveyor having a second conveying direction for conveying the unit loads one behind the other along the second conveying direction, and
      a third conveyor located between the first conveyor and the second conveyor for conveying the unit loads in a third conveying direction, which is transverse to the first and second conveying directions, the third conveyor element comprising:
         an entry side along the first conveying direction of the first conveyor adjacent the first conveyor from which the at least two unit loads are received,
         an exit side along the second conveying direction of the second conveyor adjacent the second conveyor to which the at least two unit loads are moved, and
         a conveyor surface on top of which the at least two unit loads are arranged side-by-side in a row in a direction transverse to the third conveying direction and parallel to the first and second conveying direction for parallel transport of the at least two unit loads in the third conveying direction on the conveyor surface from the entry side to the exit side;
   at least one storage and retrieval device comprising at least one carrier and a load bearing module arranged at the at least one carrier, and being provided for transport of the unit loads into the rack or retrieve the same from the rack, wherein the load bearing module has at least two carriages having a storage surface for accommodating unit loads on top thereof, the at least two carriages being attached to the at least one carrier, wherein the at least two carriages are rigidly connected to one another; and
   wherein the third conveyor comprises at least one conveyor element which is configured such that the at least two unit loads are positioned substantially adjacent in parallel along the entry side by the first conveyor and transported in a parallel, side-by-side, transverse arrangement of the row with regard to the third conveying direction on the at least one conveyor element to the exit side to be released row-by-row to the second conveyor,
   wherein the at least two carriages of the at least one storage and retrieval device have a length which substantially matches a width of the row of unit loads arranged side-by-side in the at least one conveying element of the conveyor system, and
   wherein the at least one storage and retrieval device is configured to be arranged at the first or second conveyor to receive or release unit loads row-by-row wherein the at least one conveyor element is designed such that the conveyor element is able to move transverse to the third conveying direction with the unit loads accommodated on top of the conveyor surface of the conveyor element during transport of the unit loads from the entry side to the exit side.

8. A logistics system for storage, retrieval and collation of unit loads, comprising:
   at least one store for storing the unit loads, the store comprising a rack with a rack slot, the unit loads being stored in a row in the rack slot;
   at least one conveyor system; and
   at least one storage and retrieval device for storing and releasing of the unit loads from the at least one store,
   wherein the at least one conveyor system conveys the unit loads and comprises:
      a first conveyor having a first conveying direction for conveying the unit loads one behind the other along the first conveying direction,
      a second conveyor having a second conveying direction for conveying the unit loads one behind the other along the first conveying direction, and
      a third conveyor configured for transporting at least two of the unit loads from the first conveyor to the second conveyor in a third conveying direction which is transverse to the first and second conveying direction,
   wherein the third conveyor comprises:
      an entry side along the conveying direction of the first conveyor adjacent the first conveyor from which the at least two unit loads are received,
      an exit side along the second conveying direction of the second conveyor adjacent the second conveyor to which the at least two unit loads are moved, and
      a conveyor surface on which the at least two unit loads are arranged side-by-side in a row in a direction transverse to the third conveying direction for parallel transport of the at least two unit loads in the third conveying direction on the conveyor surface from the entry side to the exit side,
   wherein the third conveyor comprises at least one conveyor element which is configured such that the at least two unit loads are positioned substantially adjacent in parallel along the entry side by the first conveyor and transported in a parallel, side-by-side, transverse arrangement of the row with regard to the third conveying direction on the at least one conveyor element to the exit side to be released row-by-row to the second conveyor,
   wherein the at least one storage and retrieval device comprising at least one carrier and a load bearing module arranged at the at least one carrier,
   wherein the load bearing module has at least two carriages having a storage surface for accommodating unit loads on top thereof, the at least two carriages being attached to the at least one carrier,
   wherein the at least two carriages of the at least one storage and retrieval device each have a length which substantially matches a width of the conveyor surface of the conveyor element, so that the length of each of the at least two carriages matches the width of a row of unit loads arranged side-by-side in the at least one conveyor element and each of the at least two carriages can accommodate exactly one of these rows, and
   wherein the at least one storage and retrieval device is configured to be arranged at the first or second conveyor to receive or release unit loads row-by-row wherein the at least one conveyor element is designed such that the conveyor element is able to move transverse to the third conveying direction with the unit loads accommodated on top of the conveyor surface of the conveyor element during transport of the unit loads from the entry side to the exit side.

9. The logistics system of claim 8, wherein the at least two carriages are rigidly connected to one another.

10. The logistics system of claim 8, wherein the store is a high-bay racking.

11. The logistics system of claim 8, wherein the storage and retrieval device is adapted to store and retrieve unit loads from the rack slot.

* * * * *